MAGNETIC TAPES COMPRISING FERRIMAGNETIC MATERIALS

Filed April 14, 1969 4 Sheets-Sheet 1

INVENTORS
ROBERT H. LINDQUIST
BERNARD F. MULASKEY
BY R. H. Davies
C. J. Tonkin
ATTORNEYS

MAGNETIC TAPES COMPRISING FERRIMAGNETIC MATERIALS

Filed April 14, 1969 4 Sheets-Sheet 2

INVENTORS
ROBERT H. LINDQUIST
BERNARD F. MULASKEY
BY R. H. Davies
C. J. Tonkin
ATTORNEYS INVENTORS
ROBERT H. LINDQUIST
BERNARD F. MULASKEY
BY Roy H. Davis
C. J. Tonkin
ATTORNEYS

MAGNETIC TAPES COMPRISING FERRIMAGNETIC MATERIALS

Filed April 14, 1969

4 Sheets-Sheet 4

INVENTORS
ROBERT H. LINDQUIST
BERNARD F. MULASKEY
BY R. H. Davies
C. J. Tonkin
ATTORNEYS United States Patent Office 3,558,354

Patented Jan. 26, 1971

3,558,354
MAGNETIC TAPES COMPRISING FERRIMAGNETIC MATERIALS

Robert H. Lindquist, Berkeley, and Bernard F. Mulaskey, Pinole, Calif., assignors to Chevron Research Company, San Francisco, Calif., a corporation of Delaware Continuation-in-part of application Ser. No. 745,565, July 17, 1968, which is a continuation-in-part of application Ser. No. 260,964, Feb. 21, 1963. This application Apr. 14, 1969, Ser. No. 815,836
Int. Cl. H01f *10/02*
U.S. Cl. 117—235 3 Claims

ABSTRACT OF THE DISCLOSURE

Magnetic recording tape comprising a supporting material and a coating comprising a plurality of particles, each of said particles comprising a ferrimagnetic material substantially surrounded by an antiferromagnetic material, said ferrimagnetic material being magnetically coupled to said antiferromagnetic material by exchange anisotropy, each of said particles having an average particle size below 1 micron, a pore volume above 0.02 cc. per gram and a surface area above 2 square meters per gram.

RELATED APPLICATIONS

This application is a continuation-in-part of application Ser. No. 745,565, filed July 17, 1968, now abandoned, which in turn is a continuation-in-part of application Ser. No. 260,964, filed Feb. 21, 1963, now U.S. Pat. 3,425,666.

INTRODUCTION

This application relates to magnetic tapes comprising ferrimagnetic materials, particularly ferrimagnetic ferrospinels (inverse ferrospinels).

The basic magnetic properties of recording tapes are coercivity, residual induction, and effective permeability. Prior art tapes are divided into three categories. Relatively low coercivity tapes with an $H_C$ of 80–120 oersteds and a residual induction $B_R$ of about 400 gauss are made from spherical particles of $\gamma$-iron oxide. Medium coercivity tapes with an $H_C$ of 200–280 oersteds and a $B_R$ of 500–900 gauss are made from acicular (needle-like) particles of $\gamma$-iron oxide. High coercivity tapes of prior art materials with an $H_C$ of 320–380 oersteds and a $B_R$ of about 600 gauss are usually made from ferrous ferrite or magnetite ($Fe_3O_4$). The effective permeability of the magnetic tapes ranges from 1 to 3. Higher coercivity tapes are preferred since higher frequencies can be impressed on them without having self-erasure (demagnetization) by interparticle magnetic interaction. Also, "print-through" between adjacent layers of tape when wound on the spool is reduced.

Moderate residual induction is desired, sufficient to produce a signal level above the background noise of the tape recorder head amplifier system. For audio, video, and instrument applications, a coercive force of about 800–1200 oersteds, after a 4600 oersted applied field, a residual induction of 400–600 gauss, after an applied field of 4600 oersteds, and a quality factor $B_R/H_C$ of about 0.4 to 0.6 is desirable but generally unobtainable by prior art tapes. For computer tapes, coercive force of about 300–500 oersteds with a high residual induction (preferably above 900 gauss) is desired to store digital information with certainty of accurate retrieval.

OBJECTS OF THE PRESENT INVENTION (1) To provide magnetic tapes comprising ferrimagnetic particles each comprising a ferrimagnetic nucleus surrounded by and coupled by exchange anisotropy to an antiferromagnetic coating, said particles having a coercive force above 500 oersteds after saturation.

(2) To provide magnetic tapes comprising ferrimagnetic particles each surrounded by a metal-oxide insulating material.

(3) To provide magnetic tapes comprising ferrimagnetic particles, a larger volume percent of which will act as single-domain particles than prior art ferrimagnetic particles, when reduced to the same particle size.

(4) To provide magnetic tapes comprising microporous ferrimagnetic particles that will act as single-domain particles when in larger particle size than prior art single-domain particles.

(5) To provide magnetic tapes comprising a coating material comprising a ferrimagnetic material having a higher coercive force with a given drive field than corresponding materials in prior art tapes, for a given tape quality factor, $B_R/H_C$.

(6) To provide magnetic tapes having a more desirable tape quality factor $B_R/H_C$ than prior art tapes, for a given coercive force.

DRAWINGS

The present invention will be better understood, and additional objects thereof will become apparent, from the following description of the invention, when read in connection with the accompanying drawings, in which.

THE PRESENT INVENTION

(A) Statement of invention, general

Figure 1:
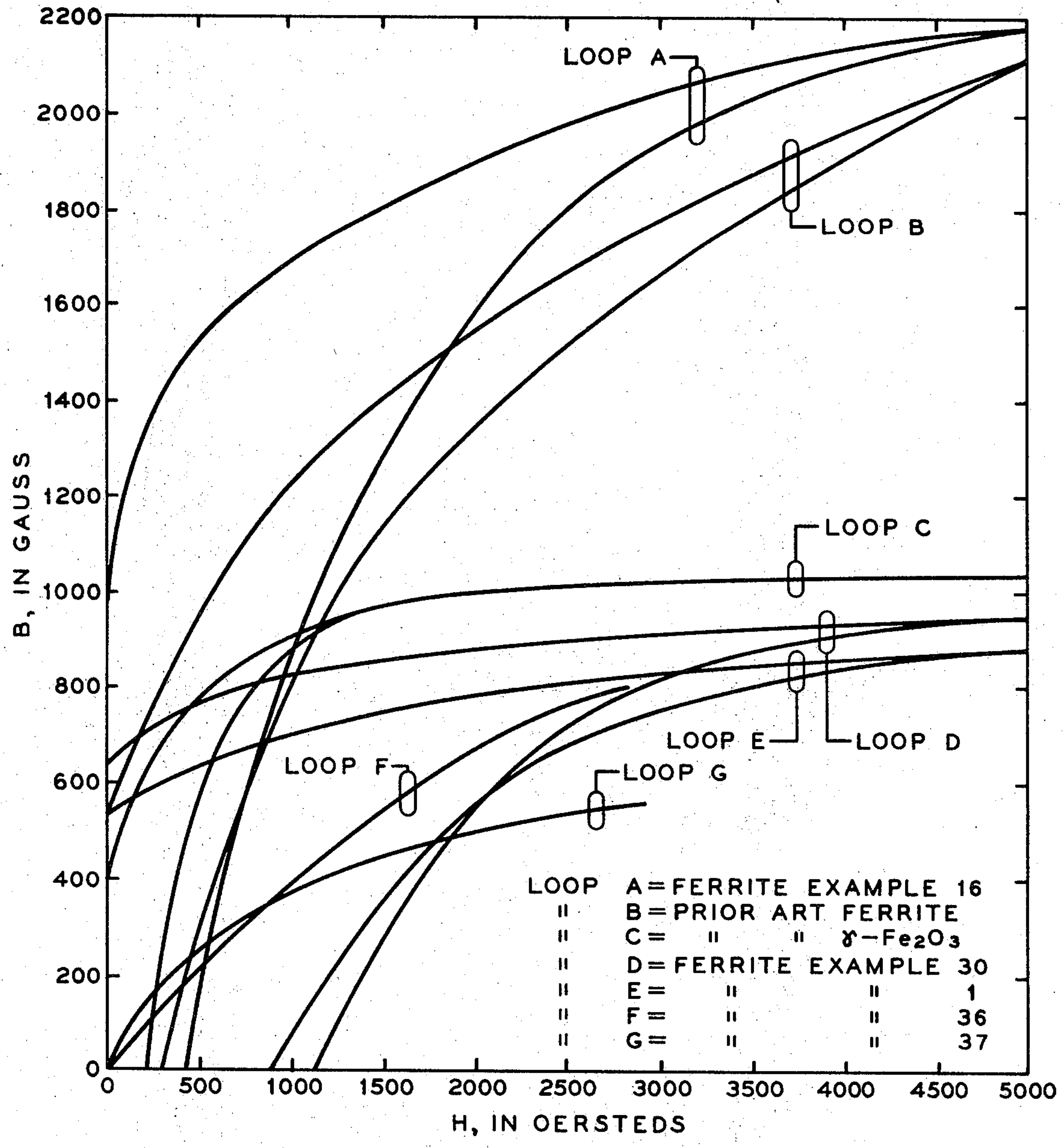
FIG. 1 is a graph showing comparisons of portions of hysteresis loops of particular ferrimagnetic materials prepared by the Microgel process discussed herein with hysteresis loops of various prior art magnetic materials.

In accordance with one embodiment of the present invention, magnetic tapes are provided which comprise superior microporous and homogeneous ferrimagnetic materials. Said superior ferrimagnetic materials may be prepared by a wet process, which can be called the Microgel process, which includes formation of a substantially homogeneous solution of the constituents of the final product, usually followed by subsequent gelation, without a precipitation step, in contrast to the prior art *oxide* and *decomposition* dry processes and the prior art *precipitation* wet process. The resulting immediate *homogeneity* of the product eliminates the need for extensive ball milling and mixing to obtain homogeneity, and only enough ball milling is needed to reduce the ferrimagnetic particles to a desirable size. The *microporosity* of the product provides myriads of natural fracture lines, enabling the product to be much more easily powdered into fine particles than prior art materials. The resulting powdered material contains a smaller ratio of superparamagnetic particles to particles that behave magnetically as single-domain particles than does a corresponding powdered material made by prior art methods. In accordance with the Microgel process, the ferrimagnetic materials may be prepared by converting a salt of a first metal, in the divalent state when a ferrite is being prepared, and a salt of a second metal in the trivalent state, at least one of said metals preferably being iron, to a mixture of the corresponding hydroxides in the presence of an epoxy compound, and converting said mixture to the desired microporous ferrimagnetic material by heating.

In accordance with another embodiment of the present invention, magnetic tapes are provided which comprises particles of a ferrimagnetic material, each substantially surrounded by an antiferromagnetic material, said two materials being coupled by exchange anisotropy.

In accordance with a further embodiment of the present invention, magnetic tapes are provided which comprise ferrimagnetic particles, each surrounded by a high-resistivity, non-magnetic metal oxide insulator, for example alumina. These particles may be prepared by forming a ferrimagnetic material precursor comprising a uniform metal hydroxide gel which, upon drying and heating to a temperature above 600° C., would be changed in structure to a ferrimagnetic-material structure, passing said gel together with a halide of the metal of the desired insulator, for example aluminum chloride, and a lower alkanol through a colloid mill to form a uniform suspension of fine particles of said gel, adding a lower alkylene oxide to said suspension to form a uniform dispersion of said gel particles in a gel of the desired insulator, for example a hydrous gel of $Al_2O_3$, and heating said uniform dispersion to a temperature above 600° C. to convert the structure of said gel particles to the desired ferrimagnetic material structure, and to convert said insulator gel to a solid form of the desired insulator, for example solid $\alpha$-$Al_2O_3$, whereby ferrimagnetic particles individually isolated in the desired insulator are produced.

(B) Details of the magnetic materials contained in the magnetic tapes of the present invention, and how they may be prepared (1) *General*.—The Microgel process, which may be used to prepare the materials contained in the magnetic tapes of the present invention, comprises converting a salt of a first metal, generally in the divalent state, and a salt of a second metal in the trivalent state, at least one of said metals preferably being iron, to a mixture of the corresponding hydroxides in the presence of an epoxy compound and a source of hydroxyl groups, for example water, said salts comprising halogens having atomic numbers greater than 9, and heating said mixture for a sufficient time to produce a ferrimagnetic material.

The epoxy compound may be any epoxy compound that will react at a reasonable rate with the anion of the metal salt, preferably a lower alkylene oxide or an epichlorohydrin. Said lower alkylene oxide may be, for example, ethylene oxide, propylene oxide or butylene oxide.

The metal salt preferably is a metal halide comprising a halogen having an atomic number greater than 9, i.e., a metal chloride, iodide or bromide. The chlorides and iodides are especially preferred. Salts other than halides, for example nitrates, having anions that will combine with the epoxy compound, may be used.

Desirably a solvent, such as a lower alcohol, should be present.

The following is an example of the reaction that takes place in the Microgel process:

$$CoCl_2+Fe^{+2}Cl_2+Fe^{+3}Cl_3+CH_3OH+H_2O +OCH_2CHCH_3 \rightarrow CoFe_2(OH)_8+A$$

where $CoFe_2(OH)_8$ is a sol that has the desired homogeneous atomic structure, i.e., it contains a uniform dispersion of each of the various ions, and where A includes all of the remaining reaction products. The $CoFe_2(O)_8$ sol will slowly form into a gel if permitted to do so, and this is a preferred method of practicing the invention. The remaining reaction products, A, mainly comprise chlorohydrins such as propylene chlorohydrin, and readily vaporize to leave the desired sol or gel in an adequately pure state.

In the above exemplary reaction, assuming that water is the source of the hydroxyl groups, a hydrogen atom from the water molecule attaches to the oxygen atom of the epoxy compound, leaving one of the epoxy compound carbon atoms with an unsatisfied bond. A halogen atom from one of the metal halides attaches to this bond, leaving the metal with an unsatisfied bond. The latter bond is satisfied with the hydroxyl group remaining from the water molecule.

Because it is important to have a homogeneous solution of all of the necessary components of the final product, it is very desirable to have a solvent present that: (a) will keep the metal salts in solution; (b) will keep the epoxy compound in solution; and (c) will not irreversibly react with the precursors of the final product, or with the final product itself, to incorporate undesired constituents into the final product. Such a solvent should be one that is more polar than the epoxy compound, for example an organic solvent such as a lower alcohol or water. If a sufficient amount of water is present, it will act as the necessary solvent in addition to supplying the hydroxyl groups for the desired product. If only water is relied upon as the solvent, it will be very desirable to use ethylene oxide as the epoxy compound rather than a higher alkylene oxide such as propylene oxide, because the solubility of ethylene oxide is higher in water than is the solubility of a higher alkylene oxide, and the higher solubility increases the probability that the desired epoxy compound concentration in the starting solution can be obtained. However, the presence of an organic solvent in addition to the presence of water is most preferred. Such a solvent may be any organic solvent meeting the aforesaid criteria, for example a lower alkanol, for example methanol, ethanol or propanol, or dimethyl formamide. Methyl alcohol is most preferred because it is very polar, as is water.

The metal halides used may be halides of any metals that are desired in the final ferrimagnetic product, so long as a halide of at least one metal, generally in the divalent state, is present, and a halide of at least one other metal, in the trivalent state, is present. For example, halides of $Fe^{+2}$, $Co^{+2}$, $Mg^{+2}$, $Ni^{+2}$, $Mn^{+2}$, $Cu^{+2}$, $Ba^{+2}$, $Fe^{+3}$, $Al^{+3}$, $Cr^{+3}$, $Ti^{+3}$, $Ga^{+3}$, $In^{+3}$, $Gd^{+3}$, $Sc^{+3}$, and $Y^{+3}$ may be used. Preferably a halide of iron will be present, more preferably $Fe^{+3}Cl_3$. The proportions of all of the starting materials can be varied over relatively wide ranges, so long as a homogeneous solution can be obtained. From the present disclosure, including the examples, those skilled in the art will have an adequate guide as to the proportions of ingredients and specific preparation methods that will result in a high degree of homogeneity of the starting mixtures and final ferrimagnetic products. Generally, the constituents of the final ferrimagnetic product may be present in approximately stoichiometric proportions in the starting materials; however, it may be desired to have present an excess of divalent or trivalent iron, particularly when it is desired that the final product have especially high coercivity.

The amounts of each of the starting halides may be varied by substituting for it a halide of a different metal having the same valance, to give various weight percentages of each metal cation in the final ferrimagnetic product.

In the preferred manner of practicing the Microgel process for preparing the materials contained in the magnetic tapes of the present invention, the sol precursor of the final ferrimagnetic material will form into a gel in a period of a few seconds to a few hours, depending upon the concentration of the various components and the temperature. The resulting gel, after drying to drive off vaporizable materials not forming a part of the gel, is nonferrimagnetic, but becomes ferrimagnetic after a subsequent heating step.

To convert the non-ferrimagnetic sol or gel to a ferrimagnetic material, it is heated to a temperature above 600° C., preferably above 800° C., more preferably between 1100° C. and 1600° C., to cause the metal cations to migrate between the oxygen anions to the proper sites, e.g., the tetrahedral or octahedral sites of a spinel oxygen structure, as previously discussed. The heating time may be varied from two or three minutes to many hours. However, the higher the temperature the less time will be required for complete cation migration, and after migration is complete continued heating is generally of little use. At 1300° C., a heating time of 3 to 5 hours is desirable. Heating may be terminated prior to complete cation migration, and therefore magnetic properties, particularly coercive force, may be varied by varying the duration of heating.

The resulting ferrimagnetic material is microporous in that it contains myriads of micropores, i.e., pores below 0.1 micron (1000 angstroms) in diameter, as well as larger pores. Although the larger pores are present, they have a much lower surface area per volume of pore, and so contribute little to the surface area of the material, compared with the contribution to surface area made by the micropores. This extremely high surface area, microporous material accordingly is much more frangible than corresponding prior art materials prepared by other processes; because the micropores constitute natural fracture lines, the material can be physically broken down into single-domain particles much more readily than can corresponding prior art materials prepared by other processes, which often must be ball milled for days before the particle diameters approach a micron or less.

Not only can the particles readily be broken down in size, but it is not necessary to break them down in size as far as in the case with prior art particles prepared by other processes in order to obtain particles having single-domain magnetic behavior. This is because as a particle is broken down in size it is still microporous, and the micropores impede domain wall movement; accordingly, when particles prepared by the Microgel process are reduced to a certain size they will behave magnetically as single-domain particles, even though more than one domain is present. Further, particle grinding of a batch of ferrimagnetic powder prepared by the Microgel process will result in a smaller ratio of superparamagnetic particles that retain no magnetization after removal of an applied field to particles that behave as single-domain particles than will particle grinding of prior art ferrimagnetic powders. I.e., in both the Microgel method and different prior art methods, milling results in the production of supermagnetic particles, larger single-domain particles that are not paramagnetic, and multi-domain particles. Because some of the latter behave as single-domain particles in the present method, the total amount of particles that behave as single-domain particles that are produced for a given production of supermagnetic particles is larger in the Microgel process than in different prior art processes. For most magnetic tape applications it is desirable to break down the particles of a mass of ferrimagnetic material to an average particle size below about one micron.

(2) *Exchange anisotropy coupling between nuclei of ferrimagnetic particles and antiferromagnetic coating surrounding said nuclei.*—The term "exchange anisotropy" was coined to describe a magnetic interaction between an antiferromagnetic material and a ferromagnetic material. The term has been extended to also cover interaction between antiferromagnetic and ferrimagnetic phases, and also between ferrimagnetic and ferromagnetic phases. In each case, the spin systems of the two phases are coupled.

In one embodiment of the present invention, magnetic tapes are provided that contain ferrimagnetic material particles that are substantially surrounded by a coating of an antiferromagnetic material. The spin systems of the two phases are coupled by exchange anisotropy to provide a resulting coated ferrimagnetic material in particulate form having a materially higher coercive force than said ferrimagnetic material would have alone, or that said ferrimagnetic and antiferromagnetic material would have together if not coupled by exchange anisotropy. In this embodiment, particles of a ferrimagnetic material, especially a ferrimagnetic ferrospinel, preferably are substantially surrounded by, and coupled by exchange anisotropy to, $\alpha$-$Fe_2O_3$. Whereas it is most difficult by most conventional methods to prepare a ferrimagnetic ferrospinel having a coercive force above 1000 oersteds, after an applied field of 4600 oersteds, this is easaly accomplished by the Microgel process by coupling to the ferrimagnetic ferrospinel by exchange anisotropy an antiferromagnetic material.

The proportion of the antiferromagnetic material, for example $\alpha$-$Fe_2O_3$, present in the final high-coercive-force material prepared by the Microgel process is dependent upon the proportion of the halides of the divalent precursor materials, for example $FeCl_2$ or $CoCl_2$, present in the starting materials, and also upon the temperature at which the mixture of starting materials is heated to convert it to a ferrimagnetic material, and to a limited extent upon the duration of the heating. The proportion of the antiferromagnetic material present in the final product can be varied from about 5 to 95 weight percent. It is increased in this range by increasing the concentration of the divalent starting halide precursor of the antiferromagnetic material, or by increasing the temperature of heating of the gel, or both. Those skilled in the art, by routine experimentation from the teachings herein, will be able to determine how these factors should be varied to vary the results in accordance with their requirements. If more than about 30 volume percent of the antiferromagnetic material is present in the final produc,t it substantially completely surrounds all of the ferrimagnetic particles.

It is to be noted that in a real sense the use in the magnetic tape field of a ferrimagnetic material coupled by exchange anisotropy to a surrounding antiferromagnetic $\alpha$-$Fe_2O_3$ is not only a departure from the prior art, but in conflict with the prior art, because the magnetic coating on most prior art tapes comprises $\gamma$-$Fe_2O_3$. In the prior art proceses, the $\gamma$-$Fe_2O_3$ is derived from $\alpha$-$Fe_2O_3$, which requires all $\alpha$-$Fe_2O_3$ to be converted to $Fe_3O_4$, for example by heating in hydrogen at 400° C., after which the $Fe_3O_4$ is converted to $\gamma$-$Fe_2O_3$, for example by heating in oxygen at 300° C.

It is known that an exchange anisotropy coupling in a material results in a hysteresis loop that is displaced along the H axis when a hysteresis loop is obtained after cooling a specimen of the material in a field to a temperature below a magnetic transition temperature, as discussed in connection with FIG. 7 herein.

Where the ferrimagnetic material comprises iron oxide, it may be coupled by exchange anisotropy to $\alpha$-iron oxide, as indicated above. Similarly, an antiferromagnetic material other than α-iron oxide, for example α-$Cr_2O_3$, may be coupled by exchange anisotropy to a ferrimagnetic material when the two materials have a similar lattice spacing. The similar lattice spacing provides the necessary close lattice coupling that is necessary for exchange anisotropy.

It is also known that the existence of exchange anisotropy coupling between ferrimagnetic and antiferromagnetic phase results in a hysteresis loop shift, and that the occurrence of this transition is proof of the existence of such coupling. The existence of this type of coupling, for example the coupling of α-$Fe_2O_3$ to a ferrimagnetic material, can be proven by making use of a magnetic transition for α-$Fe_2O_3$, called the "Morin transition," that occurs at −20° C. The antiferromagnetic electron spins of α-$Fe_2O_3$ order in the transverse plane to their direction above −20° C. when cooled through the Morin transition temperature. Thus, by cooling a magnetically saturated system of α-$Fe_2O_3$ and ferrimagnetic material coupled by exchange anisotropy through the Morin transition, a preferred direction of magnetic coupling is "locked in" and a displaced hysteresis loop will result. This transition has been noted experimentally in the materials contained in the magnetic tapes of this embodiment of the present invention.

In magnetic tape applications the ferrimagnetic particles substantially surrounded by and coupled by exchange anisotropy to an antiferromagnetic material have another outstanding advantage over prior art γ-iron oxide particles for tapes, in that the antiferromagnetic material, for example α-$Fe_2O_3$, is an excellent non-magnetic spacer for keeping the ferrimagnetic particles separated so that they do not cluster and lose their desirable magnetic characteristics. When γ-$Fe_2O_3$ particles are used for magnetic tapes in accordance with prior art procedures, it is necessary to disperse the particles in a non-magnetic spacer material such as a plastic, which often must be present in amounts of around 50 volume percent. Because the particles before they are so dispersed are magnetically agglomerated into clusters, it is necessary to use high-energy input dispersion techniques, for example ball milling of the mixture of particles and plastic for several days, in order to isolate the particles, and the resulting isolation is necessarily incomplete, leaving many chains, rings and clusters of magnetic particles. In accordance with this embodiment of the present invention, each particle is surrounded by a non-magnetic spacer during initial formation of the ferrimagnetic particles, high-energy dispersion techniques are rendered unnecessary, dilution of the particles with plastic non-magnetic spacing material which does not improve coercive force is avoided, and many other tape manufacturing problems are overcome.

(3) *Insulation of ferrimagnetic particles with a high-resistivity metal oxide.*—In the embodiment of the present invention discussed in A, above, wherein the magnetic tapes contain ferrimagnetic material particles each surrounded by an α-$Al_2O_3$ insulator, the particles may be surrounded by the insulator in the following manner.

The ferrimagnetic material precursor gel, together with aluminum chloride and a lower alkanol, are passed through a colloid mill to form a uniform suspension of fine particles of said gel. A lower alkylene oxide, for example propylene oxide, is added to said suspension to form a uniform dispersion of said particles in an $Al_2O_3$ gel, in the form of $Al(OH)_3$ which, upon heating, is converted to $Al_2O_3$ as follows:

$$2[Al(OH)_3] \rightarrow 3H_2O + Al_2O_3$$

Upon heating to a temperature above about 600° C., preferably from 800° C. to 1300° C., the structure of said gel particles is converted to a ferrimagnetic material structure, and said $Al_2O_3$ is converted to α$Al_2O_3$, the resulting material being a microporous mass easily broken down into ferrimagnetic particles, each having single-domain-particle magnetic behavior and each being individually isolated in an α$Al_2O_3$ coating. Any other desired non-magnetic, high-resistivity metal oxide, for example silica, zirconia or magnesia, may be used as a coating instead of alumina, by employing a halide of the desired metal instead of a halide of aluminum. The preferred halides for the aforesaid reaction are the chlorides, iodides and bromides, i.e., those halides comprising halogens having atomic numbers greater than 9, therefore excluding fluorides. The chlorides and iodides are especially preferred. For a silica or silica-containing coating, tetraethyl orthosilicate or a homolog thereof is preferred.

If desired, by the foregoing procedure ferrimagnetic particles may be produced each of which is surrounded by, and coupled by exchange anisotropy to, an antiferromagnetic material, with the product being further encased in a shell of the desired insulating material. The resulting composite may be incorporated into the magnetic tapes of the present invention.

As in the case where particles are provided with an antiferromagnetic coating coupled by exchange anisotropy to a ferrimagnetic core, the metal oxide coating eliminates the need for prior art expedients for dispersing ferrimagnetic particles in plastic in an attempt to eliminate clusters and chains and rings of the particles, for magnetic tape applications.

(4) *Examples of the ferrimagnetic materials contained in the magnetic tapes of the present invention, and preparation thereof*

(a) General:

In all of the following examples, the Microgel process was used to prepare ferrimagnetic materials. The gel produced in each example was dried in a drying oven to dryness at 300° F. The resulting dried product was then treated in three steps: (a) heating at 800° C. in an air atmosphere for 4 hours to convert the dried gel to a form which could be readily powdered; in this step the hydroxides were converted to mixed oxides and the material was ground to a powder; although this step was not necessary, it facilitated the production of a denser powder so that more material could be treated in a particular furnace in the subsequent heating step; (b) powdering of the resulting material in a conventional manner; (c) firing at the indicated temperature, for example 1200° C. or 1300° C., for 4 hours in order to convert the powder to a ferrimagnetic material. In each case, the type of ferrimagnetic material produced was verified by X-ray diffraction data.

Magnetic and other properties of the materials produced in the following examples are given following the examples.

(b) Ferrite examples:

*Example 1.*—A solution of the following composition was prepared:

94.4 g. $CoCl_2$
133.6 g. $FeCl_2$
428.2 g. $FeCl_3$
1000 cc. $CH_3OH$
250 CC. $H_2O$

The solution was cooled at 0° C. 200 cc. of propylene oxide were added, the temperature rose and was returned to 0° C., and 200 cc. more of propylene oxide were added. The resulting material set up into a gel in 12 minutes. A powdered portion of this gel was fired at 1300° C. to convert the powder to a ferrimagnetic material. The hysteresis loop for this material is discussed in connection with FIG. 1 herein.

*Example 2.*—A powdered portion of the gel produced in Example 1 was fired at 1200° C. to convert the powder to a ferrimagnetic material.

*Example 3.*—A solution of the following composition was prepared:

61.8 g. $CoCl_2$
120.1 g. $FeCl_2$
466.0 g. $FeCl_3$
1000 cc. $CH_3OH$
250 cc. $H_2O$

The solution was cooled to 0° C., 200 cc. of propylene oxide were added, the temperature rose and returned to 0° C., and 200 cc. more propylene oxide were added. The resulting material set up into a gel in 12 minutes. A powdered portion of this gel was fired at 1300° C. to convert the powder to a ferrimagnetic material.

*Example 4.*—A powdered portion of the gel produced in Example 3 was fired at 1200° C. to convert the powder to a ferrimagnetic material.

*Example 5.*—A solution of the following composition was prepared:

710 g. $CoCl_2$
1466 g. $FeCl_2$
4694 g. $FeCl_3$
6.6 liters $CH_3OH$
2.5 liters $H_2O$
2.0 liters propylene oxide The solution was allowed to cool to room temperature, then 2 liters more of propylene oxide were added. The resulting material set up into a gel in 2 minutes. A powdered portion of this gel was then fired at 1300° C. and the resulting material was finely ground in two successive passes through a fluid energy pulverizing machine.

*Example 6.*—A powdered portion of the material in Example 5 that had been heated at 800° C. was then fired at 1300° C., and the resulting material was finely ground in one pass through a fluid energy pulverizing machine.

*Example 7.*—A portion of the material in Example 5 that had been heated at 800° C. was then fired at 1200° C., and the resulting material was then finely ground in one pass through a fluid energy pulverizing machine.

*Example 8.*—A solution of the following composition was prepared:

237.95 g. $CoCl_2$
224.4 g. $FeCl_3$
2000 cc. $CH_3OH$
500 cc. $H_2O$

The solution was cooled to 0° C., and 670 cc. propylene oxide were added. The resulting material set up into a gel in 5 minutes. A powdered portion of this gel was fired at 1300° C. to convert the powder into a ferrimagnetic material.

*Example 9.*—A powdered portion of the gel produced in Example 8 was fired at 1200° C. to convert the powder to a ferrimagnetic material.

*Example 10.*—A powdered portion of the gel produced in Example 8 was fired at 1100° C. to convert the powder to a ferrimagnetic material.

*Example 11.*—A solution of the following composition was prepared:

237.95 g. $CoCl_2$
324.4 g. $FeCl_3$
2000 cc. $CH_3OH$
500 cc. $H_2O$

The solution was cooled to 0° C. and 670 cc. propylene oxide were added. The resulting material set up into a gel in 5 minutes. A powdered portion of this gel was fired at 1300° C. to convert the powder to a ferrimagnetic material.

*Example 12.*—A powdered portion of the gel produced in Example 11 was fired at 1200° C. to convert the powder to a ferrimagnetic material.

*Example 13.*—A powdered portion of the gel produced in Example 11 was fired at 1100° C. to convert the powder to a ferrimagnetic material.

*Example 14.*—A solution of the following composition was prepared:

178.4 g. $CoCl_2$
49.7 g. $FeCl_2$
324.4 g. $FeCl_3$
2000 cc. $CH_3OH$
500 cc. $H_2O$

The solution was cooled to 0° C. and 400 cc. propylene oxide were added. The resulting material set up into a gel in a few minutes. A powdered portion of the gel was fired at 1300° C. to convert the powder to a ferrimagnetic material.

*Example 15.*—A powdered portion of the gel produced in Example 14 was fired at 1200° C. to convert the powder to a ferrimagnetic material.

*Example 16.*—A powdered portion of the gel produced in Example 14 was fired at 1100° C. to convert the powder to a ferrimagnetic material. The hysteresis loop for this material is discussed in connection with FIG. 1 herein.

*Example 17.*—A solution of the following composition was prepared:

324.4 g. $FeCl_2$
1500 cc. $CH_3OH$
250 cc. $H_2O$

The solution was cooled to 0° C. and 270 cc. propylene oxide were added. The resulting material set up into a gel in 5 minutes. A powdered portion of this gel was fired at 1300° C. to convert the powder to $\alpha$-iron oxide.

*Example 18.*—A solution of the following composition was prepared:

482.9 g. $AlCl_3$
1500 cc. $CH_3OH$
250 cc. $H_2O$

*Example 19.*—To one-third the gel in Example 17 was added one-half of the solution in Example 18. The resulting mixture was mixed in a colloid mill for 15 minutes, then 270 cc. propylene oxide were added. The resulting material set up into a gel in 5 minutes. A powdered portion of this material was heated at 1300° C. to convert the powder to a ferrimagnetic material.

*Example 20.*—To one-third of the gel in Example 17 were added one-half of the solution in Example 18. The resulting mixture was mixed in a colloid mill for one hour, then 220 cc. propylene oxide wer added. The resulting material set up into a gel in 5 minutes. A powdered portion of this material was heated at 1300° C. to convert the powder to a ferrimagnetic material.

*Example 21.*—A solution of the following composition was prepared:

94.5 g. $CoCl_2$
133.6 g. $FeCl_2$
428.2 g. $FeCl_3$
1000 cc. $CH_3OH$
250 cc. $H_2O$

The solution was cooled to 0° C., 200 cc. propylene oxide were added, the temperature was allowed to return to 0° C., and 200 cc. more of propylene oxide were added. The resulting material set up into a gel in 12 minutes. A powdered portion of this material was fired at 1300° C. to convert the powder to a ferrimagnetic material.

*Example 22.*—A further powdered portion of the material in Example 21 was fired at 1100° C. to convert the powder to a ferrimagnetic material.

*Example 23.*—A solution was prepared in the same proportion as, and in 1⅓ times the volume of, the solution of Example 18.

*Example 24.*—One-half the solution of Example 23 was added to one-third of the gel material in Example 21.

The mixture was mixed in a colloid mill for 15 minutes, then 270 cc. propylene oxide were added. The resulting material set up into a gel in one hour. A powdered portion of this material was fired at 1300° C. to convert the powder to a ferrimagnetic material.

*Example 25.*—A further powdered portion of the material in Example 24 was fired at 1100° C. to convert the powder to a ferrimagnetic material.

*Example 26.*—One-half the solution in Example 23 was added to one-third of the gel material in Example 21. The mixture was mixed in a colloid mill for one-half hour, then 220 cc. propylene oxide were added. The resulting material set up into a gel in one hour. A powdered portion of this material was fired at 1200° C. to convert the powder to a ferrimagnetic material.

*Example 27.*—A further powdered portion of the gel material in Example 26 was fired at 1100° C. to convert the powder to a ferrimagnetic material.

*Example 28.*—A solution of the following composition was prepared:

1071 g. $CoCl_2$
1515 g. $FeCl_2$
2903 g. $FeCl_3$
22 liters $CH_3OH$
4 liters $H_2O$ The solution was cooled to 13° C., 2250 cc. propylene oxide were added, the temperature rose to 34° C., 2250 cc. more of propylene oxide were added, and the resulting material set up into a gel in 3 minutes. After drying at 300° C., this material had a pore volume of 0.144 cc. per gram, and a surface area of 16 m.$^2$/g. A powdered portion of this gel was heated at 800° C. for 4 hours to convert the powder to a ferrimagnetic material, and then ground to 100 mesh. The resulting material had a pore volume of 0.06 cc. per gram, and a surface area of 3 m.$^2$/g. A further powdered portion of the aforesaid gel was fired for 4 hours at 1300° C. to convert the powder to a ferrimagnetic material having the magnetic properties listed in the table below, and having a pore volume of 0.0313 cc./gram and a surface area of 3 m.$^2$/g. after being ground to 100 mesh. The aforesaid pore volumes and surface areas are typical of the ferrimagnetic materials prepared by the Microgel process; the powdered materials have an average particle size below 1 micron, together with pore volumes above 0.02 cc. per gram, and surface areas above 2 m.$^2$/gram, in comparison with prior art materials which do not have such large pore volumes and high surface areas.

*Example 29.*—A powdered portion of the gel material in Example 28 was fired at 1300° C. to convert the powder to a ferrimagnetic material.

*Example 30.*—A further powdered portion of the gel material in Example 28 was fired at 1300° C. to convert the powder to a ferrimagnetic material. The hysteresis loop for this material is discussed in connection with FIG. 1 herein.

*Example 31.*—A further powdered portion of the ferrimagnetic material in Example 28 was more finely powdered by passage through a fluid energy pulverizing machine.

*Example 32.*—Example 31 was repeated with a further powdered portion of the ferrimagnetic material in Example 28. A specimen made from the resulting ferrimagnetic material was cooled in liquid nitrogen and a Morin transition obtained, evidencing the presence of exchange anisotropy coupling between the ferrimagnetic component and the antiferromagnetic component of each particle, as discussed in connection with FIG. 7 herein.

*Example 33.*—Example 31 was repeated with a further powdered portion of the ferrimagnetic material in Example 28.

*Example 34.*—Example 31 was repeated with a further powdered portion of the ferrimagnetic material in Example 28.

*Example 35.*—For purposes of comparison with the material produced in Example 32, a cobalt ferrite was prepared by conventional prior art methods. 15.05 g. $\gamma$-$Fe_2O_3$ and 4.6 g. CoO were ball milled in a conventional ball mill for 84 hours, after which the mixture was fired for 4 hours at 1300° C. X-ray diffraction examination showed that the resulting material was all cobalt ferrite, and therefore contained no $\alpha$-iron oxide. The material was cooled in liquid nitrogen and an attempt was made to obtain a displaced hysteresis loop evidencing the presence of exchange anisotropy coupling, with negative results.

*Example 36.*—A solution of the following composition was prepared:

34 g. $FeCl_3$
12.5 g. $MgCl_2$
37 g. $MnCl_2$
750 cc. $CH_3OH$
water of hydration of chlorides
500 ml. propylene oxide The resulting material set up into a gel, $$Mg_{0.5}Mn_{1.5}Fe_{1.0}(OH)_8$$

in 30 minutes. A portion of this material, after being heated 4 hours at 800° C., was compressed into a disc shape, then reduced in hydrogen in a magnetic field of 10,000 oersteds at 450° C. for 4 hours.

*Example 37.*—A solution of the following composition was prepared:

34 g. $FeCl_3$
12.5 g. $MgCl_3$
37 g. $MnCl_2$
30 g. $AlCl_3$
750 cc. $CH_3OH$
water of hydration of chlorides
500 ml. propylene oxide The resulting material set up into a gel, $$Mg_{0.5}Mn_{1.5}Fe_{1.0}Al_{1.0}(OH)_{11}$$

in 10 minutes. A portion of this material, after being heated 4 hours at 800° C. to produce a substitution ferrite having a stoichiometric excess of aluminum, was compressed into a disc shape, then reduced in hydrogen in a magnetic field of 10,000 oersteds at 450° C. for 4 hours.

TABLE OF MAGNETIC PROPERTIES OF MATERIALS PRODUCED IN FOREGOING FERRITE EXAMPLES

| | Molecular proportions of starting materials | | | | | | | | | | | |
|---|---|---|---|---|---|---|---|---|---|---|---|---|
| Example No. | $Co^{+2}$ | $Fe^{+2}$ | $Fe^{+3}$ | O | $Al_2O_3$, vol. percent | $B_R$ | $B_{AF}$ | $H_C$ | $B_R/B_{AF}$ | $\mu_0$ | Firing temp., ° C. | Applied field (AF) oersteds |
| 1 | 0.5 | 0.95 | 2.0 | 4.0 | | 479 | 870 | 855 | 0.545 | 1.2 | 1,300 | 4,600 |
| 2 | 0.5 | 0.95 | 2.0 | 4.0 | | 310 | 1,107 | 296 | 0.280 | 1.8 | 1,200 | 4,600 |
| 3 | 0.3 | 0.7 | 2.0 | 4.0 | | 273 | 557 | 756 | 0.490 | 1.1 | 1,300 | 4,600 |
| 4 | 0.3 | 0.7 | 2.0 | 4.0 | | 185 | 740 | 279 | 0.250 | 1.1 | 1,200 | 4,600 |
| 5 | 0.15 | 0.85 | 2.0 | 4.0 | | 329 | 623 | 920 | 0.521 | 0.83 | 1,300 | 4,600 |
| 6 | 0.15 | 0.85 | 2.0 | 4.0 | | 382 | 672 | 854 | 0.569 | 0.74 | 1,300 | 4,600 |
| 7 | 0.15 | 0.85 | 2.0 | 4.0 | | 208 | 651 | 296 | 0.320 | 1.5 | 1,200 | 4,600 |
| 8 | 1.0 | 0.0 | 2.0 | 4.0 | | 703 | 2,424 | 122 | 0.290 | 2.1 | 1,300 | 4,600 |
| 9 | 1.0 | 0.0 | 2.0 | 4.0 | | 372 | 1,698 | 43 | 0.219 | 5.7 | 1,200 | 4,600 |
| 10 | 1.0 | 0.0 | 2.0 | 4.0 | | 669 | 2,505 | 122 | 0.267 | 2.0 | 1,100 | 4,600 |
| 11 | 1.0 | 0.0 | 2.0 | 4.0 | | 680 | 2,765 | 99 | 0.246 | 2.4 | 1,300 | 4,600 |
| 12 | 1.0 | 0.0 | 2.0 | 4.0 | | 480 | 2,124 | 99 | 0.226 | 2.7 | 1,200 | 4,600 |

TABLE—Continued

| Example No. | Molecular proportions of starting materials: $Co^{+2}$ | $Fe^{+2}$ | $Fe^{+3}$ | O | $Al_2O_3$, vol. percent | $B_R$ | $B_{AF}$ | $H_C$ | $B_R/B_{AF}$ | $\mu_0$ | Firing temp., ° C. | Applied field (AF), oersteds |
|---|---|---|---|---|---|---|---|---|---|---|---|---|
| 13 | 1.0 | 0.0 | 2.0 | 4.0 | | 808 | 2,384 | 148 | 0.339 | 1.96 | 1,100 | 4,600 |
| 14 | 0.75 | 0.25 | 2.0 | 4.0 | | 841 | 2,604 | 230 | 0.323 | 1.4 | 1,300 | 4,600 |
| 15 | 0.75 | 0.25 | 2.0 | 4.0 | | 802 | 2,481 | 263 | 0.323 | 1.2 | 1,200 | 4,600 |
| 16 | 0.75 | 0.25 | 2.0 | 4.0 | | 961 | 2,445 | 427 | 0.393 | 1.3 | 1,100 | 4,600 |
| 17 | 0.0 | 1.0 | 0.0 | 3.0 | | 11 | 19 | 552 | 0.566 | 0.25 | 1,300 | 4,600 |
| 18 | 0.0 | 0.0 | 0.0 | | | | | | | | | |
| 19 | 0.0 | 3.0 | 2.0 | 4.0 | 50.0 | 3 | 9 | 109 | 0.360 | 0.21 | 1,300 | 4,600 |
| 20 | 0.0 | 3.0 | 2.0 | 4.0 | 50.0 | 4 | 16 | 99 | 0.260 | 0.47 | 1,300 | 4,600 |
| 21 | 0.5 | 0.95 | 2.0 | 4.0 | | 578 | 979 | 772 | 0.590 | 1.3 | 1,300 | 4,600 |
| 22 | 0.5 | 0.95 | 2.0 | 4.0 | | 290 | 764 | 427 | 0.379 | 0.67 | 1,100 | 4,600 |
| 23 | 0.0 | 0.0 | 0.0 | | | | | | | | | |
| 24 | 0.5 | 0.95 | 2.0 | 4.0 | 50.0 | 269 | 386 | 158 | 0.698 | 3.4 | 1,300 | 4,600 |
| 25 | 0.5 | 0.95 | 2.0 | 4.0 | 50.0 | 89 | 187 | 362 | 0.476 | 1.7 | 1,100 | 4,600 |
| 26 | 0.5 | 0.95 | 2.0 | 4.0 | 50.0 | 126 | 242 | 240 | 0.519 | 2.0 | 1,200 | 4,600 |
| 27 | 0.5 | 0.95 | 2.0 | 4.0 | 50.0 | 85 | 178 | 329 | 0.475 | 1.3 | 1,100 | 4,600 |
| 28 | 0.5 | 0.95 | 2.0 | 4.0 | | 653 | 932 | 756 | 0.700 | 1.8 | 1,300 | 4,600 |
| 29 | 0.5 | 0.95 | 2.0 | 4.0 | | 667 | 966 | 1,038 | 0.690 | 1.8 | 1,300 | 4,600 |
| 30 | 0.5 | 0.95 | 2.0 | 4.0 | | 651 | 879 | 1,084 | 0.740 | 1.6 | 1,300 | 4,600 |
| 31 | 0.5 | 0.95 | 2.0 | 4.0 | | 875 | 1,326 | 1,512 | 0.66 | 0.59 | 1,300 | 4,600 |
| 32 | 0.5 | 0.95 | 2.0 | 4.0 | | 1,346 | 1,794 | 5,717 | 0.75 | 1.08 | 1,300 | 15,000 |
| 33 | 0.5 | 0.95 | 2.0 | 4.0 | | 1,403 | 2,093 | 2,696 | 0.67 | 1.7 | 1,300 | 15,000 |
| 34 | 0.5 | 0.95 | 2.0 | 4.0 | | 1,446 | 1,944 | 5,771 | 0.74 | | 1,300 | 15,000 |
| 35 | 0.5 | 0.95 | 2.0 | 4.0 | | 449 | 748 | 2,157 | 0.60 | 0.98 | 1,300 | 15,000 |
| | $Mg^{+2}$ | $Mn^{+2}$ | $Fe^{+3}$ | O | $Al^{+3}$ | | | | | | | |
| 36 | 0.5 | 1.5 | 1.0 | 4.0 | | 15.5 | 946 | <15 | 0.166 | 2.0 | 800 | 3,000 |
| 37 | 0.5 | 1.5 | 1.0 | 4.0 | 1.0 | 10.0 | 492 | 10− | 0.2 | 10+ | 800 | 3,000 |

(c) Magnetic tape examples

*Example 1.*—A magnetic tape is fabricated using the material of ferrite example 30 herein. The material, after being calcined for 4 hours at 1300° C. and then powdered in a fluid energy pulverizing machine, is dispersed in an acrylic plastic and the dispersion is used to coat a Mylar film backing. While the coatinng is beinng dried, the tape is subjected to a magnetic field to align the magnetic particles in a desired direction. The quality factor (ratio of residual induction to coercive force) is 0.6, a very desirable value for high-frequency video and audio tape, and the coercive force at an applied field of 4600 oersteds is around 1000, also a very desirable value. These magnetic properties permit the tape to satisfactorily record a given frequency signal at a far slower tape speed than most conventional tapes. This is an example of a magnetic tape pursuant to the present invention having a coercive force from 800 to 1200 oersteds after an applied field of 4600 oersteds, a residual induction of 400 to 600 gauss after an applied field of 4600 oersteds, and a quality factor $B_R/H_C$ of 0.4 to 0.6.

*Example 2.*—A magnetic tape is fabricated as in Example 1, using the material of ferrite Example 16 herein, powdered in a fluid energy pulverizing machine. The high residual induction (960 gauss), in combination with the low coercive force of 427 oersteds, at 4600 oersteds applied field, results in a magnetic tape capable of high-density data recording in computer tape applications.

(c) Discussion of drawings

FIG. 1 is a graph showing comparisons of hysteresis loops of particular ferrimagnetic materials prepared by the Microgel process described herein, compared with hysteresis loops of various magnetic materials prepared by other methods, and indicating that the magnetic properties of materials prepared by the Microgel process can be varied over an extremely wide range.

The portions of the hysteresis loops shown are third quadrant portions, obtained as follows. The specimens tested were in the form of discs one-quarter inch in diameter and one-eighth inch thick. Each disc in turn was placed in the magnet gap of a conventional vibrating sample magnetometer, with the diameter of the disc parallel to the applied field. The applied field was increased from zero to 4600 oersteds and then decreased to zero. The specimen was then rotated 180° about the diameter axis so that the residual field of the specimen opposed the direction of the applied field. The applied field was then increased at a gradual rate starting from zero. Because the magnetic induction of the specimen was negative as the result of rotation of the specimen, the magnetometer recorder pen rode on the bottom of the chart as though the induction were zero until the applied field was equal to the coercive force $H_C$. At this point, the trace of the hysteresis loop left the ezro induction line and rose rapidly, approaching saturation induction at 4600 oersteds applied field. The applied field was then decreased to zero gradually, and the trace of the hysteresis loop reached the value of $B_R$ at zero field, completing the trace of the third quadrant portion of the hysteresis loop.

Loop A is a portion of the hysteresis loop of a disc made from the ferrimagnetic material of ferrite Example 16 herein, and indicates that the material has a high magnetic induction at saturation, together with a relatively high residual induction.

Loop A is a portion of the hysteresis loop of a disc made from the ferrimagnetic material of ferrite Example 16 herein, and indicates that the material has a high magnetic induction at saturation, together with a relatively high residual induction.

Loop B is a portion of a hysteresis loop of a disc made from a cobalt ferrite prepared by prior art methods and having the composition $Co_{0.15}Fe_{0.85}{}^{+2}Fe_2{}^{+3}O_4$.

Loop C is a portion of a hysteresis loop of a disc prepared from $\gamma$-iron oxide of the type generally used commercially in magnetic tapes. It will be noted that the coercive forces for this material is about 230 oersteds, and the residual induction is about 390 gauss.

Loop D is a portion of a hysteresis loop of a disc prepared from the ferrimagnetic material of ferrite Example 30 herein. It will be noted that this material possesses very desirable magnetic properties for magnetic tape applications, in this case a coercive force of 1084 oersteds and a residual induction of 650.6 gauss.

Loop E is a portion of a hysteresis loop of a disc made from the ferrimagnetic material of ferrite Example 1 herein. It will be noted that this material also possesses very desirable magnetic properties for magnetic tape applications, in this case a coercive force of 854.4 oersteds and a residual induction of 478.5 gauss.

Loop F is a portion of a hysteresis loop of a disc made from the ferrimagnetic material of ferrite Example 36 herein. It will be noted that the loop is so narrow as to have negligible area and appear as a single line, indicating that this material is valuable in applications requiring low hysteresis losses. It will also be noted that this material exhibits a very low coercive force, making the material valuable for many applications wherein this characteristic is necessary.

Loop G is a portion of a hysteresis loop of a disc made from the ferrimagnetic material of ferrite Example 37 herein. It will be noted that this loop is similar to loop F in that it indicates the material to have a very low hysteresis loss and a very low coercive force.

Figure 2:
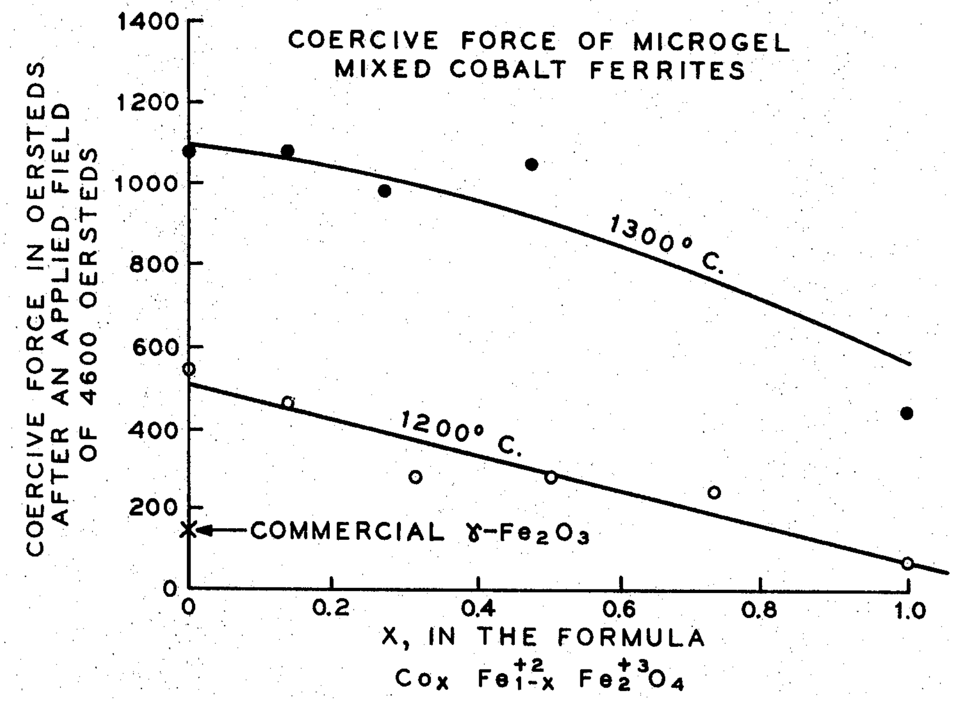
FIG. 2 is a graph showing coercive force after an applied field of 4600 oersteds as a function of composition, for various mixed cobalt ferrites prepared by said Microgel process, prepared with firing temperatures of 1200° C. and 1300° C., respectively.

FIG. 2 is a graph showing coercive force after an applied field of 4600 oersteds as a function of the composition, for various mixed cobalt ferrites prepared by the Microgel process, prepared by firing at 1200° C. for 4 hours, and by firing at 1300° C. for 4 hours, respectively. The increase in coercive force is attributable to increased exchange anisotropy coupling between the ferrimagnetic portion of the material and the antiferromagnetic portion. The principal factor during preparation of ferrimagnetic materials prepared by the Microgel process that influences coercive force is the firing temperatures of the gel material. A subsidiary factor having less effect is the concentration of divalent cobalt, when cobalt ferrites are prepared. As the concentration of divalent cobalt increases, the concentration of $\alpha$-iron oxide decreases, resulting in a decrease in coercive force.

The point X on the graph indicates the coercive force, after an applied field of 4600 oersteds, of commercial $\gamma$-$Fe_2O_3$, for purposes of comparing the coercive force of this material with the coercive force of the mixed cobalt ferrites prepared by the Microgel process.

Figure 3:
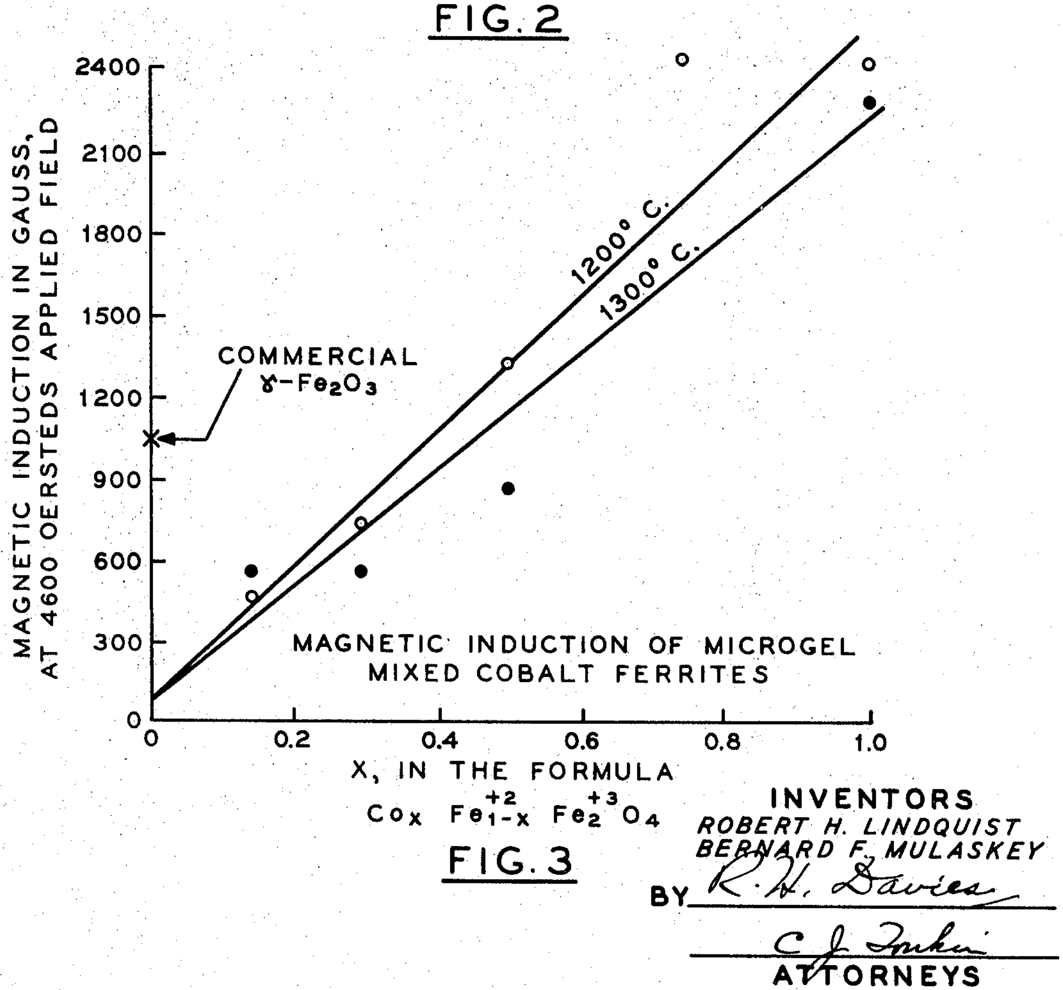
FIG. 3 is a graph of magnetic induction at a field of 4600 oersteds as a function of composition of mixed cobalt ferrites prepared by said Microgel process, prepared with firing temperatures of 1200° C. and 1300° C., respectively.

FIG. 3 is a graph of magnetic induction at a field of 4600 oersteds as a function of composition of mixed cobalt ferrites prepared by the Microgel process, prepared by firing at 1200° C. for 4 hours, and by firing at 1300° C. for 4 hours, respectively.

It will be noted that the magnetic induction varies little with firing temperature but increases drastically with increasing cobalt concentration. Part of the drastic increase is due to the decrease in $\alpha$-iron oxide concentration with increasing cobalt concentration as described in connection with FIG. 2. The major portion of the drastic increase is due to increased saturation magnetization with an increased concentration of cobalt.

The point X on the graph indicates the magnetic induction in gauss at a field of 4600 oersteds of commercial $\gamma$-$Fe_2O_3$, for purposes of comparison with the magnetic induction of mixed cobalt ferrites prepared by the Microgel process.

Figure 4:
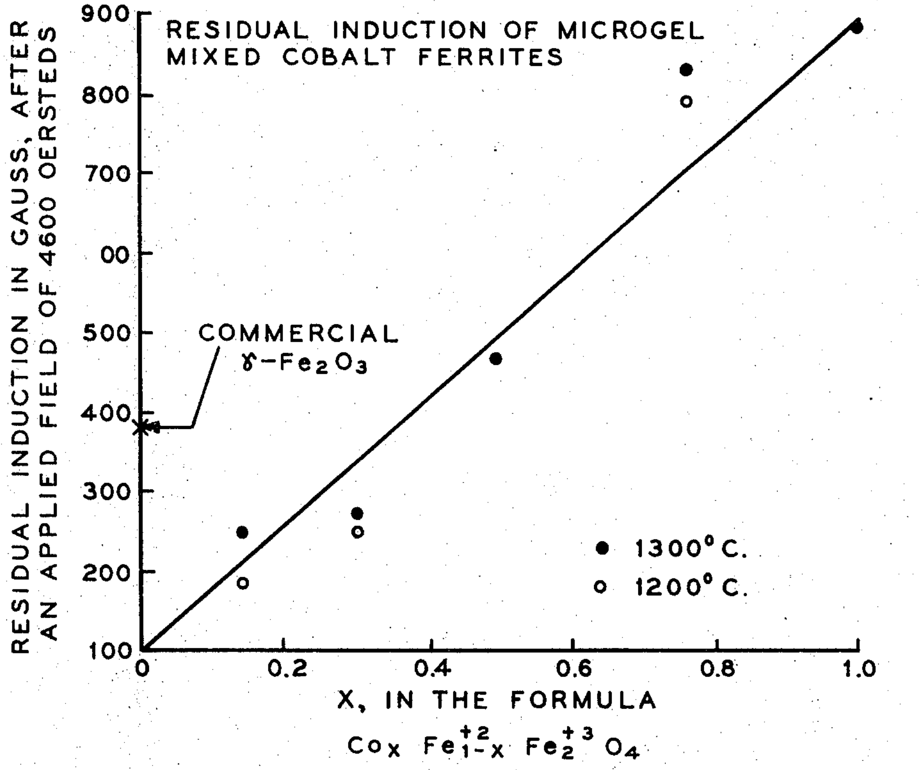
FIG. 4 is a graph of residual induction after an applied field of 4600 oersteds as a function of composition of mixed cobalt ferrites prepared by said Microgel process, prepared at firing temperatures of 1200° C. and 1300° C., respectively.

FIG. 4 is a graph of residual induction after an applied field of 4600 oersteds as a function of composition of mixed cobalt ferrites prepared by the Microgel process, prepared by firing for 4 hours at 1200° C., and by firing for for 4 hours at 1300° C., respectively. It will be noted that the temperature of firing has a minor effect on residual induction, just as it had a minor effect on magnetic induction in FIG. 3. The major factor affecting the residual induction is the concentration of cobalt in the ferrite.

The point X on the graph indicates the magnetic induction in gauss at a field of 4600 oersteds of commercial $\gamma$-$Fe_2O_3$, for purposes of comparison with the magnetic induction of mixed cobalt ferrites prepared by the Microgel process.

Figure 5:
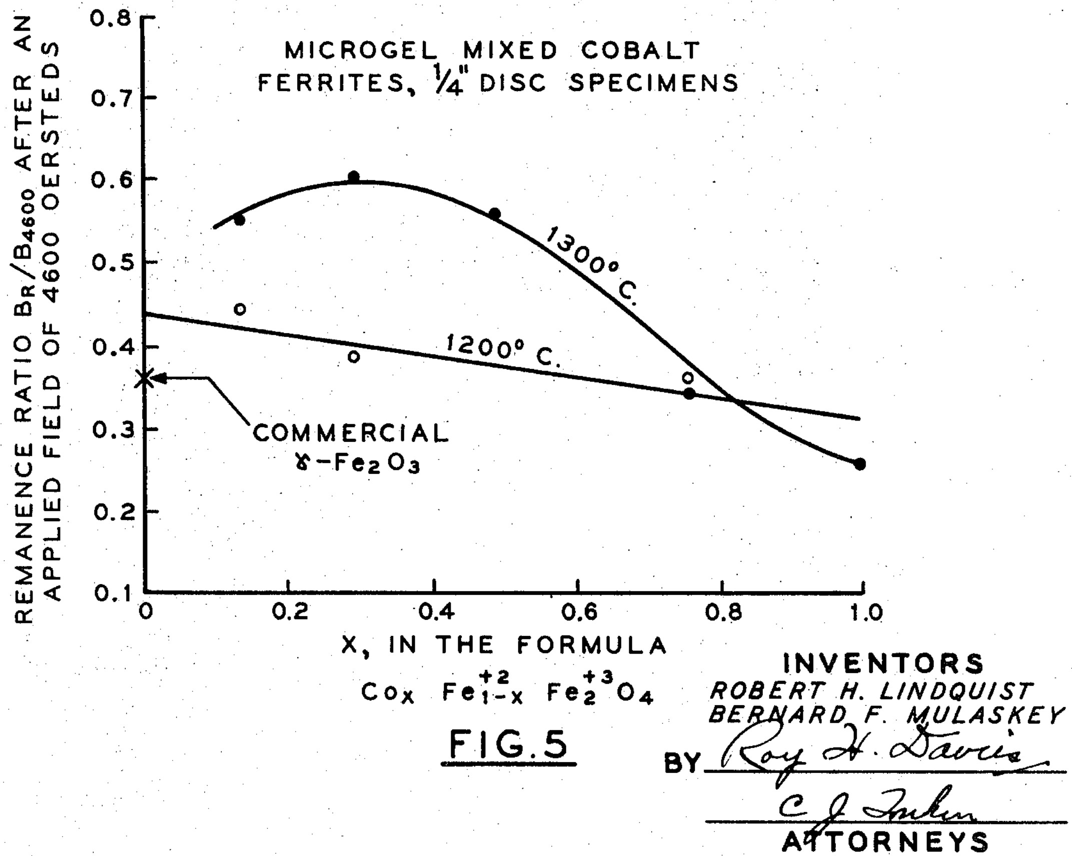
FIG. 5 is a graph of remanence ratio after an applied field of 4600 oersteds as a function of composition of mixed cobalt ferrites prepared by said Microgel process, prepared at firing temperatures of 1200° C. and 1300° C., respectively.

FIG. 5 is a graph of remanence ratio after an applied field of 4600 oersteds as a function of composition of mixed cobalt ferrites prepared by the Microgel process, prepared by firing for 4 hours at 1200° C., and by firing for 4 hours at 1300° C., respectively. The remanence ratio is substantially affected by both firing temperature and ferrite composition.

The high values of remanence ratio for various ferrite compositions prepared by the Microgel process, as shown by the two curves, are mainly due to the dispersing effect of an $\alpha$-iron oxide coating around each ferrite particle, which to a large degree prevents particle-to-particle magnetic interaction.

The point X on the graph indicates the remanence ratio after an applied field of 4600 oersteds of commercial $\gamma$-$Fe_2O_3$, conventionally used as the magnetic component in coatings for magnetic tapes. The indicated low remanence ratio for commercial $\gamma$-$Fe_2O_3$ is primarily due to the close packing of the particles of $\gamma$-$Fe_2O_3$. In conventional magnetic tape manufacture, it is necessary to attempt to disperse the particles of $\gamma$-iron oxide in a plastic; however, it is extremely difficult even by this expedient to obtain a resulting remanence ratio of 0.7.

It will be noted that by the Microgel process ferrites can be produced with remanence ratios tailored to desired values, by varying temperature and ferrite composition during manufacture.

Figure 6:
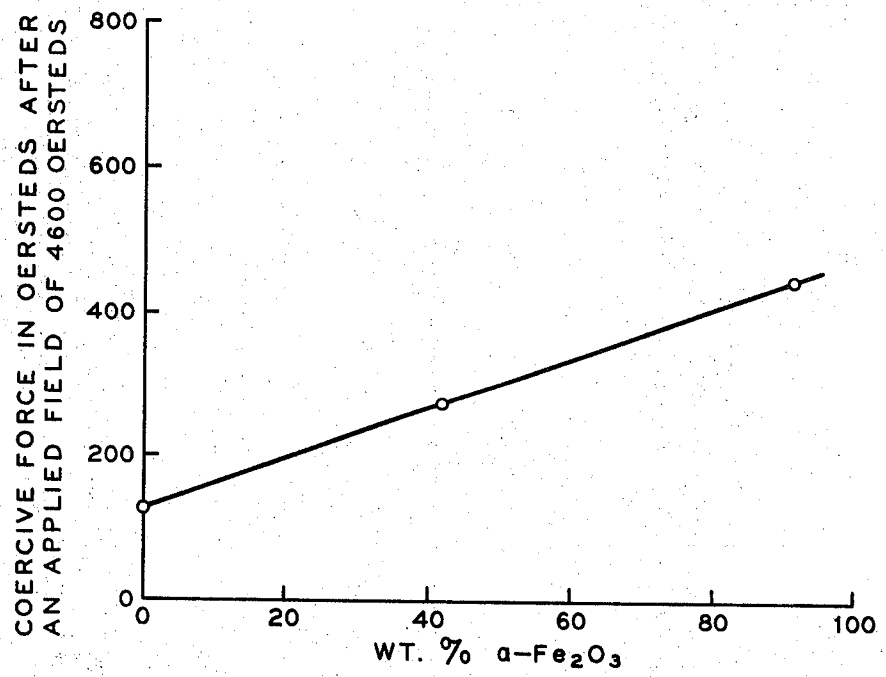
FIG. 6 is a graph showing coercive force, after an applied field of 4600 oersteds, of ferrimagnetic materials comprising mixed cobalt ferrites coupled by exchange anisotropy to $\alpha$-iron oxide prepared by said Microgel process, as a function of weight percent of $\alpha$-iron oxide present.

FIG. 6 is a graph showing coercive force, after an applied field of 4600 oersteds, of ferrimagnetic materials comprising mixed cobalt ferrites coupled by exchange anisotropy to $\alpha$-iron oxide by the Microgel process, as a function of the weight percent of $\alpha$-iron oxide present. The weight percent of $\alpha$-iron oxide was determined by conventional X-ray diffraction powder techniques. As the concentration of $\alpha$-iron oxide increases, the thickness of the $\alpha$-iron oxide surrounding the ferrite nucleus of each particle increases. Therefore, the number of electron spins coupled to the ferrite nucleus by exchange anisotropy increases; therefore the material has a higher coercive force because a larger external field is needed to change the orientation of the magnetization of the material from one easy direction to another.

Figure 7:
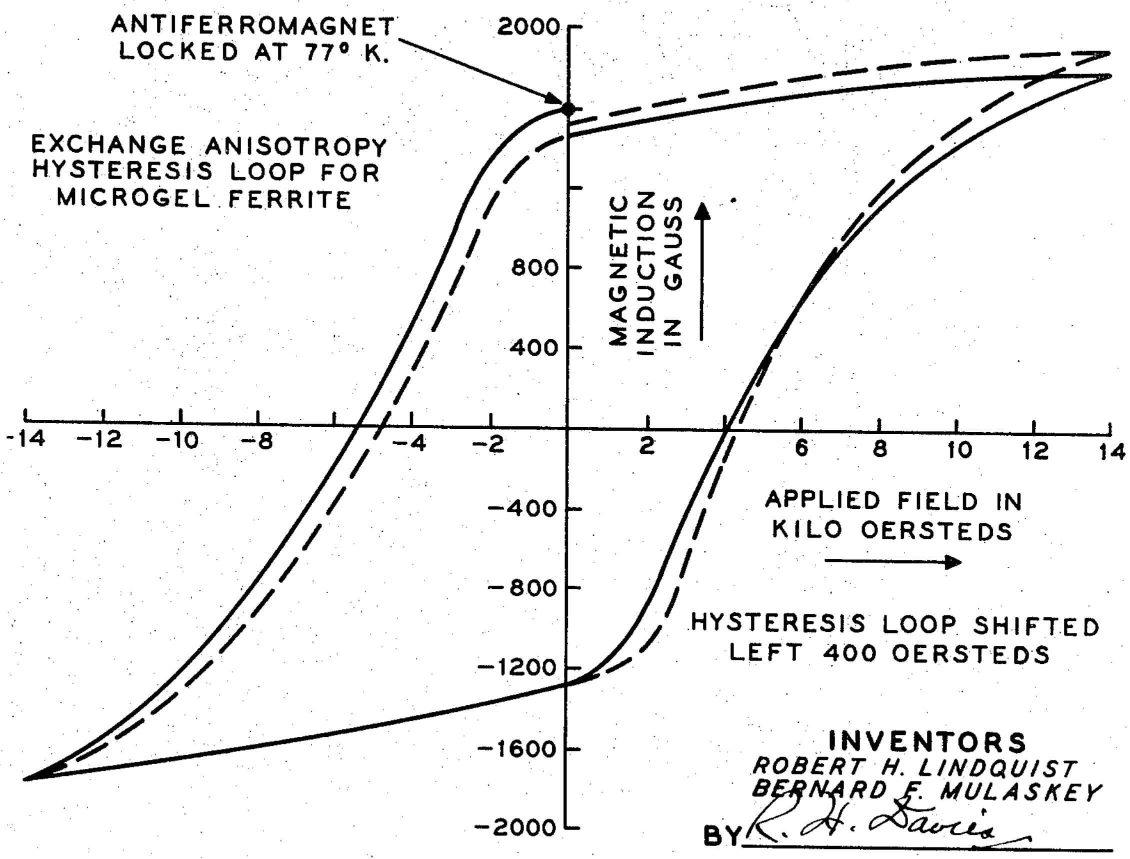
FIG. 7 is a graph of hysteresis loop demonstrating exchange anisotropy coupling between the ferrimagnetic component and the antiferromagnetic component of a high coercive force material prepared by said Microgel process.

FIG. 7 is a graph of a hysteresis loop demonstrating exchange anisotropy coupling between the $\alpha$-iron oxide component and the cobalt ferrite nucleus component of particles prepared by the Microgel process. The hysteresis loop shown was obtained in the following manner. A specimen made from the material of ferrite Example 32 herein, having a coercive force above 5000 oersteds at −196° C., comprising cobalt ferrite and 50 volume percent $\alpha$-iron oxide, was magnetized in a field of 15,000 oersteds, to "lock in" the spins of the cobalt ferrite and the $\alpha$-iron oxide. The specimen was then cooled in liquid nitrogen (−196° C.), the field was removed, and the specimen was rotated 180° in the equipment used to apply the field, so that the next application of a field would be in a direction opposite to the previous applied field. A hysteresis loop was then obtained for the specimen, and was traced through all quadrants twice, yielding the curve shown. The final cyclic loop is displaced approximately 400 oersteds to the left due to the magnetic bias resulting from "locking in" antiferromagnetic $\alpha$-iron oxide preferred orientation as it was cooled below −20° C., the Morin transition temperature. This foregoing is the recognized definitive test for determining the existence of exchange anisotropy coupling, which coupling is proven to exist by the displaced hysteresis loop.

Although only specific embodiments of the present invention have been described, numerous variations can be made in these embodiments without departing from the spirit of the invention, and all such variations that fall within the scope of the appended claims are intended to be embraced thereby.

What is claimed is:

1. A magnetic recording tape comprising a supporting material and a coating comprising a binder and a plurality of particles, each of said particles comprising a ferrimagnetic material substantially surrounded by a coating of antiferromagnetic material, said ferrimagnetic material being magnetically coupled to said antiferromagnetic material by exchange anisotropy whereby said particles have a materially higher coercive force than said ferrimagnetic material alone, each of said particles having an average particle size below 1 micron, a pore volume above 0.02 cc. per gram, and a surface area above 2 square meters per gram.

2. A magnetic recording tape as in claim 1, each of said particles comprising ferrite particles, and said antiferromagnetic material comprising $\alpha$-$Fe_2O_3$.

3. A magnetic recording tape as in claim 1, said coating having a coercive force from 800 to 1200 oersteds after an applied field of 4600 oersteds, a residual induction of 400 to 600 gauss after an applied field of 4600 oersteds, and a quality factor of 0.4 to 0.6.

References Cited

UNITED STATES PATENTS

| | | | |
|---|---|---|---|
| 3,004,918 | 5/1956 | Schnettler | 252—62.5 |
| 3,047,429 | 7/1962 | Stoller et al. | 117—169 |
| 3,026,215 | 3/1962 | Fukuda et al. | 117—235 |

WILLIAM D. MARTIN, Primary Examiner

B. D. PIANALTO, Assistant Examiner

U.S. Cl. X.R.

117—234, 238; 252—62.54